United States Patent
Duchon

(10) Patent No.: US 6,371,413 B1
(45) Date of Patent: Apr. 16, 2002

(54) ARTIFICIAL SATELLITE EQUIPPED WITH GENERATORS OF MAGNETIC AND AERODYNAMIC MOMENTS AND CONTROL PROCESS FOR SUCH A SATELLITE

(75) Inventor: Paul Duchon, Venerque (FR)

(73) Assignee: Centre National d'Etudes Spatiales, Paris (FR)

( * ) Notice: Subject to any disclaimer, the term of this patent is extended or adjusted under 35 U.S.C. 154(b) by 0 days.

(21) Appl. No.: 08/716,281

(22) PCT Filed: Mar. 29, 1995

(86) PCT No.: PCT/FR95/00393

§ 371 Date: Oct. 30, 1996

§ 102(e) Date: Oct. 30, 1996

(87) PCT Pub. No.: WO95/26905

PCT Pub. Date: Oct. 12, 1995

(30) Foreign Application Priority Data

Mar. 30, 1994 (FR) .............................. 94 03765

(51) Int. Cl.[7] .............................................. B64C 1/24
(52) U.S. Cl. ................... 244/164; 244/166; 244/168
(58) Field of Search ................... 244/166, 168, 244/164

(56) References Cited

U.S. PATENT DOCUMENTS

| 3,061,239 A | * | 10/1962 | Rusk | 244/166 |
| 3,116,035 A | * | 12/1963 | Cutler | 244/168 |
| 3,162,764 A | * | 12/1964 | Haviland | 244/164 |
| 3,304,028 A | * | 2/1967 | Dryden | 244/168 |
| 4,426,052 A | * | 1/1984 | Hubert et al. | 244/168 |
| 4,746,085 A | * | 5/1988 | Bruderle | 244/166 |
| 4,807,835 A | * | 2/1989 | Fowler | 244/166 |
| 5,716,031 A | | 2/1998 | Duchon | |

FOREIGN PATENT DOCUMENTS

JP            297399     * 11/1989    ................ 244/168

* cited by examiner

Primary Examiner—Charles T. Jordan
Assistant Examiner—Tien Dinh
(74) Attorney, Agent, or Firm—Oblon, Spivak, McClelland, Maier & Neustadt, P.C.

(57) ABSTRACT

Orientation system and process of an artificial satellite in low orbit. Aerodynamic control surfaces producing rotations of the satellite by upper-layer atmosphere are combined along two axes to magnetic couplers (1, 2, 3) producing rotating movements along the three principal axes of pitch, roll and yaw thanks to the Earth's magnetic field. Great precision may be obtained in orienting the satellite without substantial energy consumption. Command laws are provided.

15 Claims, 6 Drawing Sheets

Figure 1:
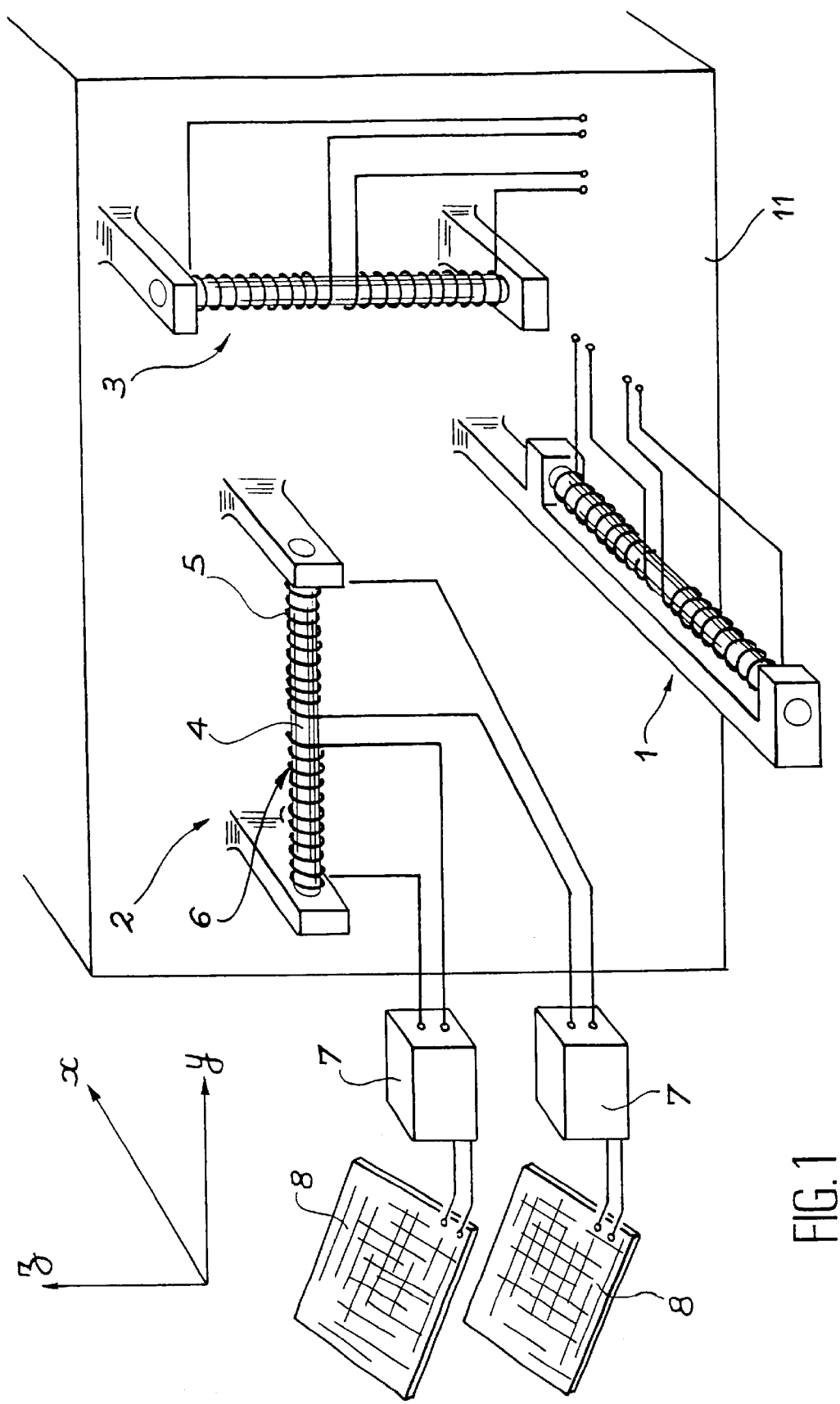

ARTIFICIAL SATELLITE EQUIPPED WITH GENERATORS OF MAGNETIC AND AERODYNAMIC MOMENTS AND CONTROL PROCESS FOR SUCH A SATELLITE

This invention concerns an artificial satellite equipped with means of creating moments of both magnetic and aerodynamic origin, and a control process for such a satellite.

It is to be compared with the subject of the French patent whose application has been registered under No. 9304953 and which describes an artificial satellite equipped with aerodynamic orientation control surfaces and traveling in low or very low orbit, that is to say whose altitude, or apogee altitude if the orbit is elliptical, is less than 600 km in the case of the Earth. The invention is also applicable to other planets provided that such planets possess an atmosphere. In fact, the rarefied gases of the upper layers of the atmosphere, made up essentially of atomic oxygen for the Earth, may exert rotation moments on the satellite. The aerodynamic control surfaces, which exploit this circumstance, consist of turning panels which are oriented in order to oppose a cross-section of greater or lesser size to the flow or to supply it with an oblique and variable flight direction. It is possible to produce moments of any direction in function of the layout and orientation of the panels. In this way the orientation of the satellite is adjusted so as to maintain, against all disruptive influences, the pointing of instruments and detectors towards an objective, or of photovoltaic cells towards the sun.

The aerodynamic control surfaces have the advantage of economizing the ergol on board in relation to the thrusters or other means of the same type commonly used to move and orient the satellites, but they nevertheless consume this energy, directly for moving the said satellites and indirectly to compensate for the drag effect which they cause it is therefore desirable, while appreciating such means, to seek to reduce their number or attenuate their use.

The underlying idea of the invention therefore consists in combining the aerodynamic control surfaces with other means, namely magneto-couplers or magnetic torque generators supplied with renewable energy by photovoltaic cells and having the capacity to produce rotation moments in the presence of an ambient magnetic field such as the Earth's magnetic field, according to the formula $\overline{C}=\overline{M}^\wedge\overline{B}$ where $\overline{C}$ is a torque in newton-meters, $\overline{M}$ a magnetic moment in ampere-turns/square meters and $\overline{B}$ a magnetic field in tesla. An unwelcome result of this formula is that the torques around the direction of the ambient magnetic field cannot be produced. It is for this reason that recourse will be made to aerodynamic control surfaces although they may also be used as complementary means of magnetic torques produced around other axes.

Other satellites are also known on which the magnetic torques are used, either in isolation or as a complement to orientation systems such as reaction wheels or momentum wheels when the said wheels reach saturation point, but it would seem that adjustable aerodynamic control surfaces have never been proposed except in the recent, previously mentioned patent application by the same author.

The aerodynamic control surfaces will produce torques and rotations around two of the principal axes of the satellite whose orientation will be chosen in function of the orbit position in relation to the magnetic field of the Earth or the planet under consideration. The magnetic couplers will produce moments around the three principal axes of the satellite. The orientation system will thus possess means which are concurrent but not superfluous inasmuch as the satellite traveling in orbit and pointed in an invariable direction will never have a fixed orientation in relation to the direction of the field, with the result that the magnetic torques will each in turn have their use, and the advantage derived from having recourse to them is such as to make them preferable to the control surfaces, despite the fact that some of them have only a slight effect.

To summarize, the invention concerns in its most general form an artificial satellite, characterized in that it comprises magnetic generators for producing rotation moments around three principal axes of the satellite, and turning external panels to supply aerodynamic rotation moments around two of the principal axes, depending on the type and orbit of the satellite in function of command laws associating the magnetic generators and the panels in order to induce them to produce variable moments. The invention also concerns a process which may be used for such a satellite in orbit around a planet and immersed in an atmosphere and a magnetic field, characterized in that it consists of periodically measuring or estimating the planet's magnetic field in relation to the principal axes of the satellite, and of calculating the rotation moments to be produced around the principal axes by the magnetic generators and the external panels.

Figure 2:
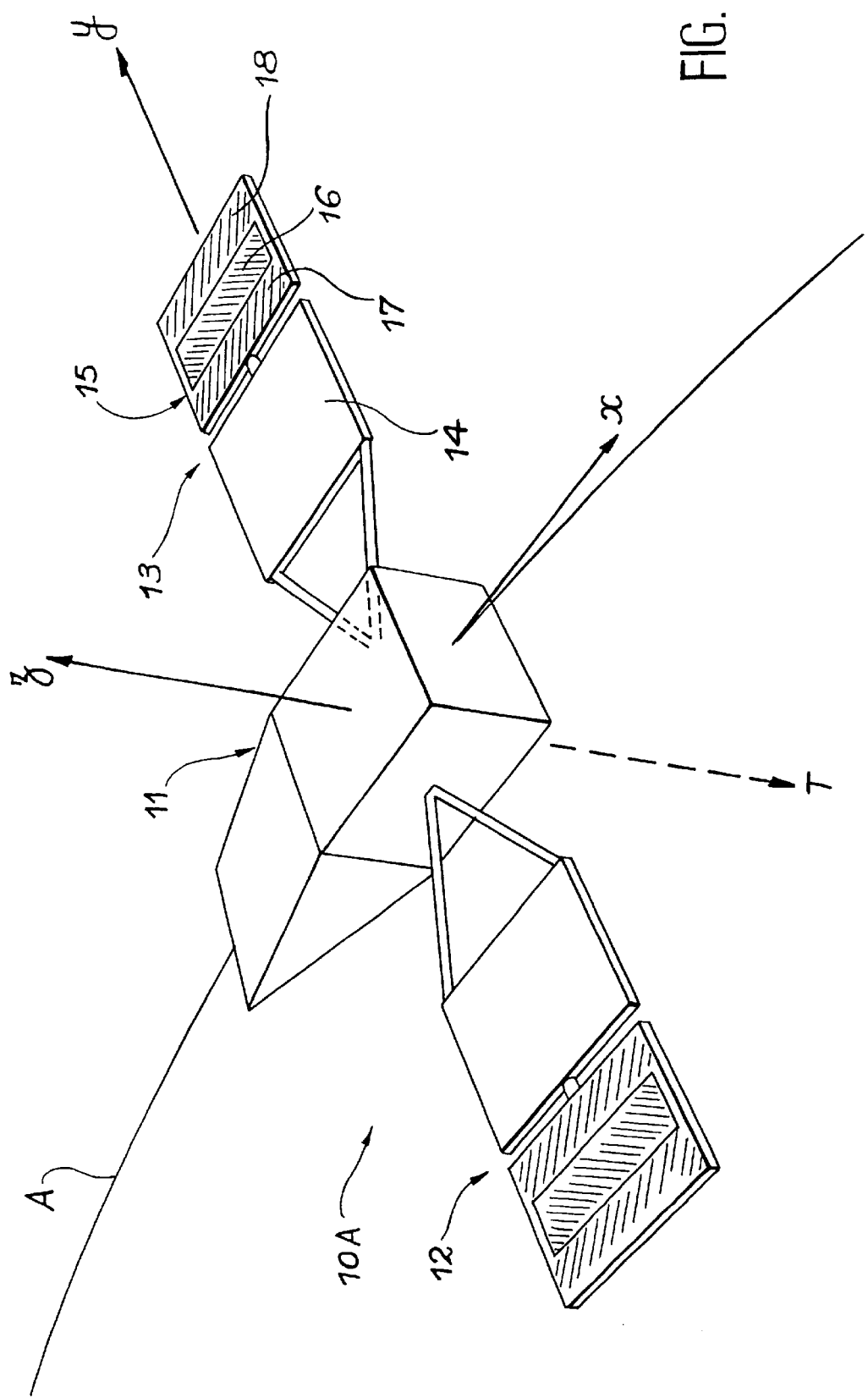
Figure 3:
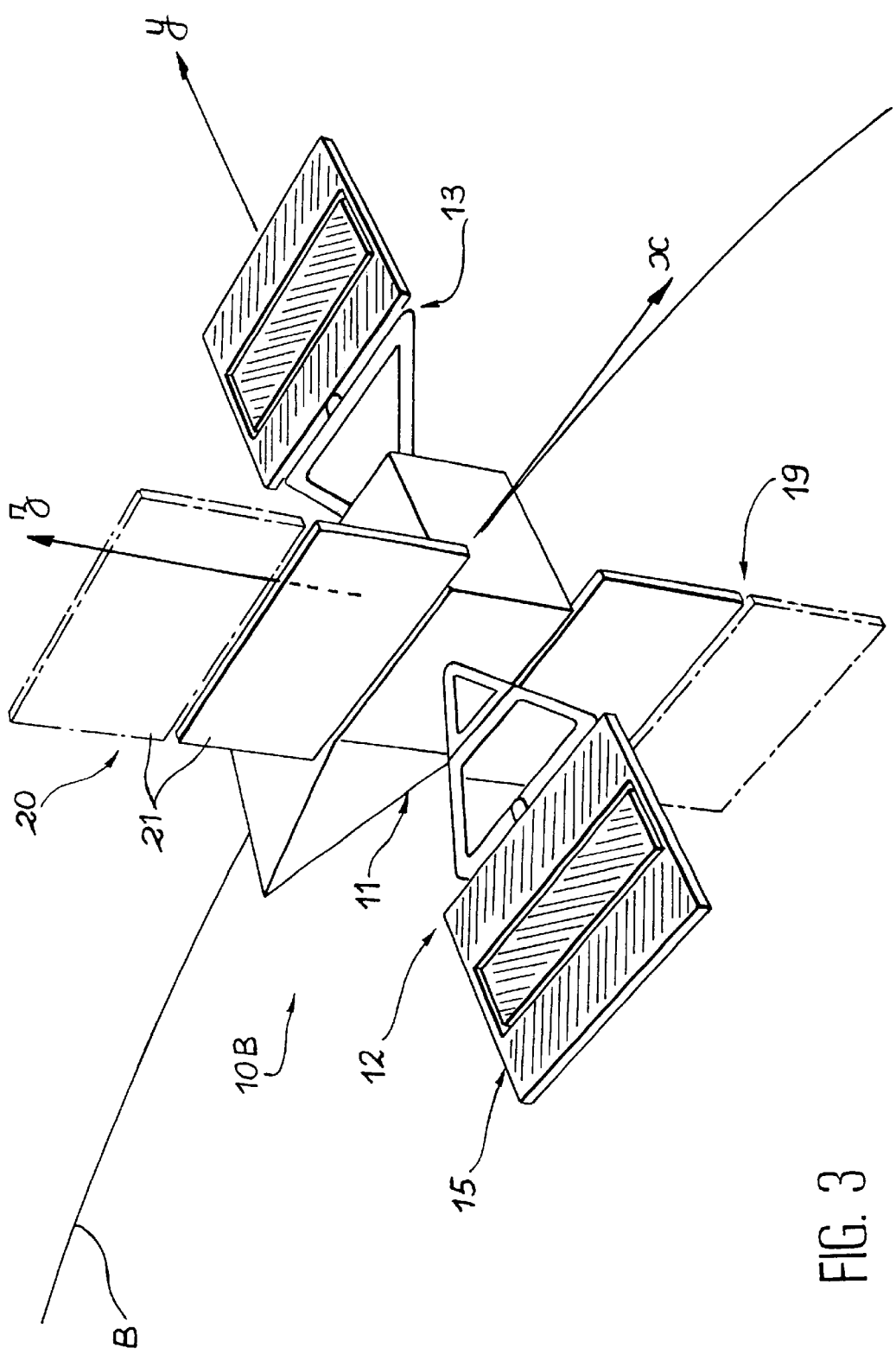
Figure 4:
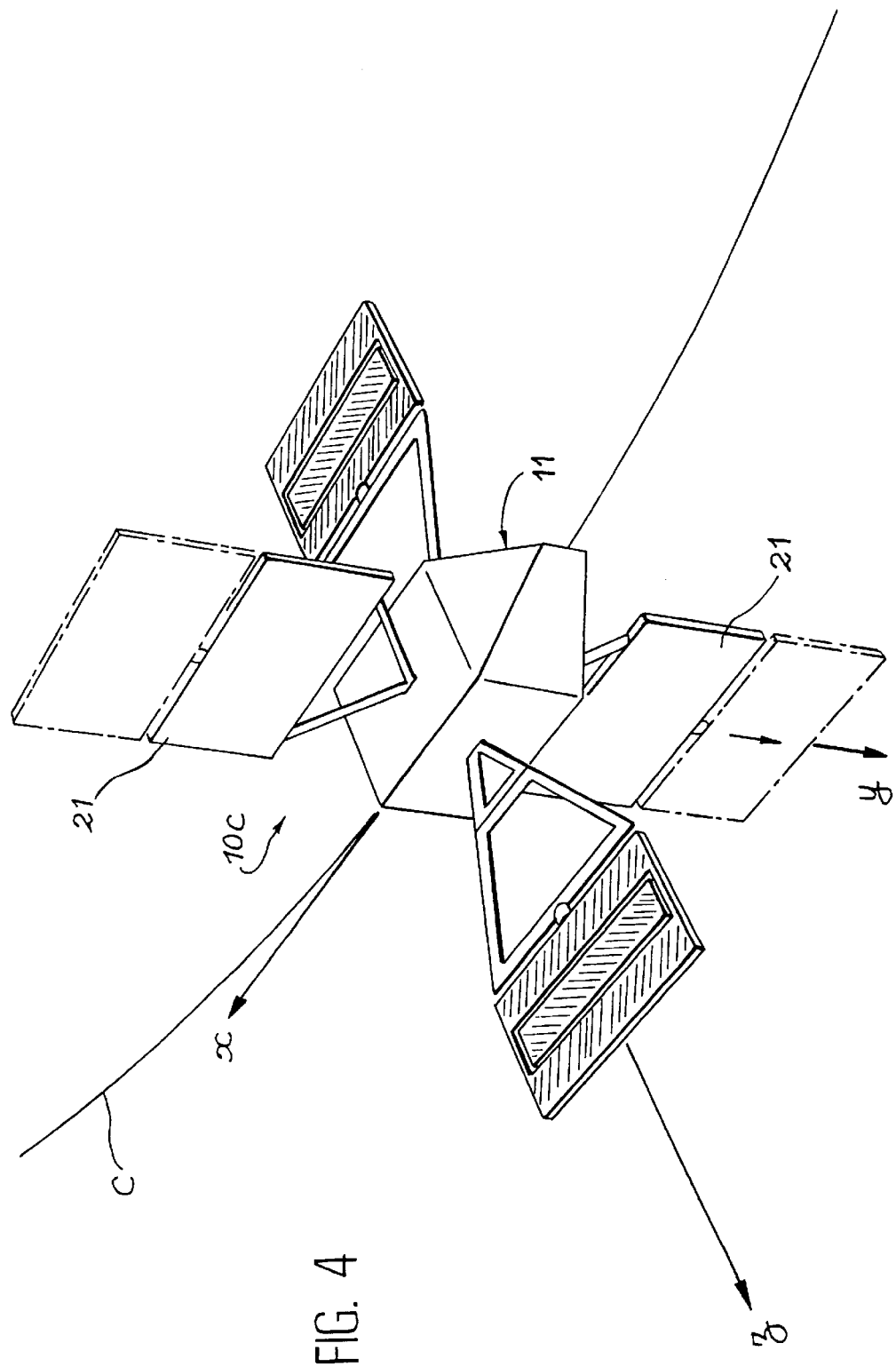
Figure 5:
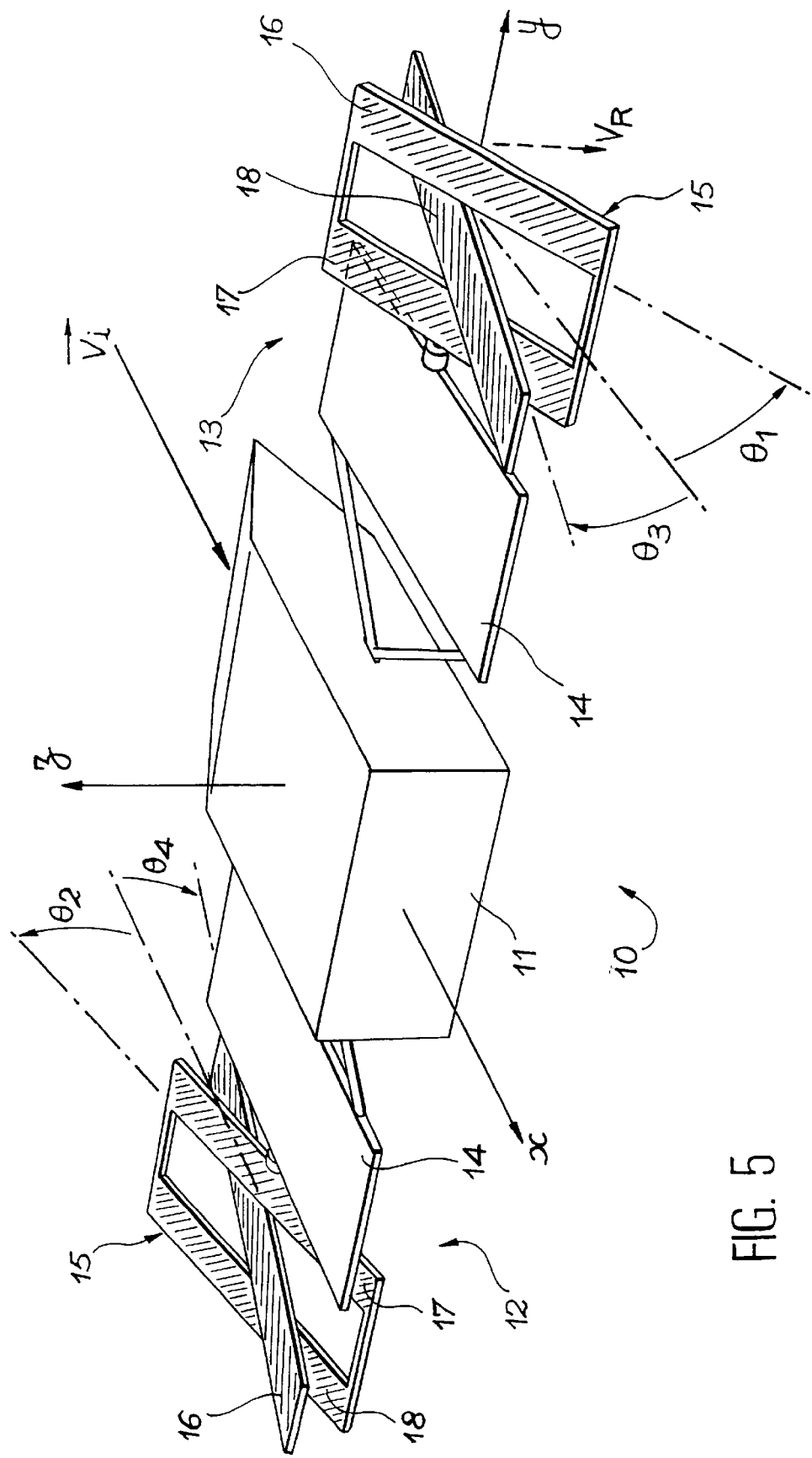
Figure 6:
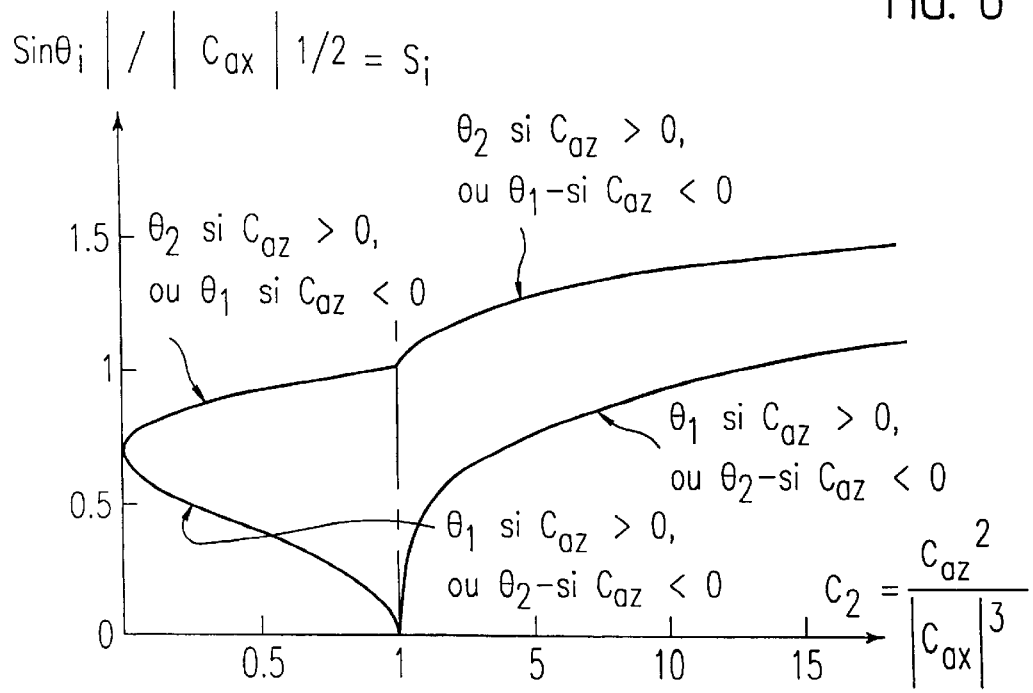
Figure 7:
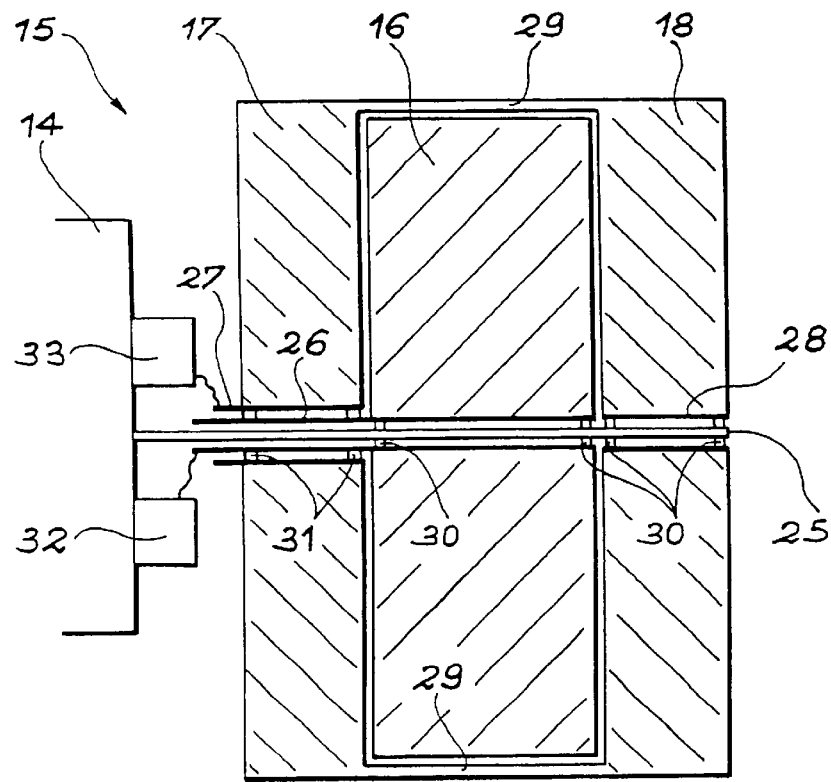

The invention will now be described in greater detail by means of several embodiments and with the help of the accompanying illustrative but non-limitative figures, in which:

FIG. 1 represents a system of magnetic couplers,

FIG. 2 represents a satellite on a particular orbit on which the invention is applied, FIG. 3 represents a different satellite, adapted for traveling on a different orbit, FIG. 4 represents a satellite analogous to that represented in FIG. 3 but traveling on a third type of orbit, FIG. 5 illustrates the control of the aerodynamic control surfaces, FIG. 6 is a graphic representation of curves symbolizing the control of these surfaces, and FIG. 7 illustrates the arrangement of the aerodynamic control surfaces.

FIG. 1 represents magnetic couplers 1, 2 and 3, all of similar constitution and consisting of a cylindrical ferromagnetic core 4 around which two electric windings 5 and 6 reel their coils. The windings 5 and 6 are connected to batteries 7 which are in turn supplied by two photovoltaic cells 8 inserted in the panels of the satellite facing the sun. The magnetic couplers 1, 2 and 3 have their cores 4 oriented respectively along three principal axes of the satellite X, Y and Z, all perpendicular to each other.

In principle, only one of the windings 5 and 6 is used at a time, the other one being additional and held in reserve in the event of damage to the first winding. When a current circulates in the windings 5 and 6, a magnetic field representative of a dipolar magnetic moment $\vec{M}$ is induced in the axis of the core 4 concerned. A mechanical torque $\vec{C}$ is then produced in the core 4 in order to align it with the direction of the ambient mechanical field $\vec{B}$, according to the formula given above $\vec{C}=\vec{M}^\wedge\vec{B}$. This torque is transmitted to the satellite, to which the cores 4 are subjugated, in order to turn it altogether. It should be noted that these magnetic couplers 1, 2 and 3 are inoperative when their core 4 is oriented according to the ambient field $\vec{B}$.

FIG. 2 represents a satellite 10A carrying the magnetic couplers 1, 2 and 3 which are deemed to be housed in a central body 11 of the satellite 10A from which two masts 12 and 13 protrude, which said masts are unfurled when the satellite 10A is released from its launching rocket and is put into orbit. The masts 12 and 13 are similar, aligned and situated on either side of the central body 11, and, moving away from the said central body, carry a solar panel 14 containing the previously mentioned photovoltaic cells 8, and then an aerodynamic control surface 15 consisting of a central panel 16 and two end panels 17 and 18 framing the said central panel 16. In point of fact, the end panels 17 and 18 are semi-panels turning in unison around an axis of the extension of the masts 12 and 13, here corresponding to the pitch axis y of the satellite 10A, and the central panel 16 turns around the same axis independently of the others. The rotation axis is materialized by hollow shafts carrying the panels and turning in a fixed support shaft protruding from the extremity of the solar panel 14. This simple mechanical system is represented in FIG. 7. The fixed shaft is marked 25, and the hollow shafts of panels 16 to 18 are marked 26 to 28 respectively; the rods connecting the end panels 17 and 18 to each other beyond the edges of the central panel 16 are marked 29; the bearings allowing the hollow shafts 26 and 28 to be carried by the hollow shaft 29 are marked 30; the bearings allowing the hollow shaft 27 to be carried by the hollow shaft 26 are marked 31; and references 32 and 33 are given to the electrical motor and transmission systems which move respectively the hollow shafts 26 and 27, thus causing the central panel 16 and the end panels 17 and 18 respectively to turn independently by resting on the solar panel 14.

The control surface panels 16 to 18 are arranged symmetrically on the other of the masts 12 and 13, having the same dimensions as their counterparts and being powered by independent systems.

Finally, it should be noted that the central panels 16 have a surface which is equal to the sum of that of the end panels 17 and 18.

The satellite 10A travels on an orbit A to which the roll axis X is tangential and oriented in the opposite direction to the path of the satellite. The yaw axis Z belongs to the plane of the orbit A and is opposed to the direction T of the center of the Earth. The pitch axis Y is consequently perpendicular to the plane of the orbit A, as well as the masts 12 and 13, and directed so as to render give direct identification of X, Y and Z. In the present case, the orbit A is a sun-synchronous orbit at 12 and 24 hours local time, which passes almost above the Earth's poles since the orbital plane makes an angle of about 100° with the equatorial plane. The earth's magnetic field $\overline{B}$ is then almost parallel to the orbital plane, at approximately 20°. This result is valid for all quasi-polar orbits.

It is observed that a roll rotation around the axis X may be ordered by changing the orientation of the central panel 16 or of the end panels 17 and 18, according to choice, of one of the masts 12 or 13 and by imposing a corresponding rotation in the opposite direction to the identical panels on the other mast 13 or 12, from the neutral position in which all the panels extend in a plane parallel to that which is tangential to the orbit 1. The increased resistance to the rarefied air thus produced is manifested by the forces directed along the yaw axis Z, off-center in opposite directions and whose value depends on the extent of the inclination. Drag forces along the roll axis X are also produced; since they are equal and in the same direction they do not produce moments, but they slow down the satellite 10A and require the use of energy to keep it at the desired speed, which explains why it is best to avoid recourse to this means whenever possible. If, however, the control surface panels 16, 17 and 18 of one of the masts 12 and 13 are moved by equal angles in opposite directions, starting from the neutral position of these panels (in the plane of orbit A), a rotation is produced around the yaw axis Z because the satellite is slowed on the side of this mast 12 or 13 only, and no other rotation is produced since the central panel 16 has a surface equal to the total surface of the end panels 17 and 18, with the result that the forces directed in the yaw axis Z cancel themselves out. The aerodynamic control surfaces 15 therefore make it possible to communicate roll and yaw rotations to the satellite 10A. The pitch rotations will be assured by the magnetic couplers alone, which is always possible since the pitch axis 10 remains perpendicular, or almost perpendicular, to the direction of the Earth's magnetic field B, irrespective of the position of the satellite 10A on the orbit A. The magnetic couplers 1, 2 and 3 may also exert rolling and yawing moments of variable value according to the position of the satellite 10A: the yawing moment of magnetic origin will be virtually nil above the poles, the rolling moment virtually nil at the ascending and descending nodes of the orbit A, and the two moments will be better distributed at intermediate latitudes; the action of the aerodynamic control surfaces 15 will. supplement the defective moments of magnetic origin.

The focus of attention now passes to FIG. 3 which represents a satellite 10B equipped to travel on a sun-synchronous orbit at 6 and 18 hours local time. The Orbit B is once again quasi-polar and has an inclination of approximately 100° on the equatorial plane. The situation is not fundamentally different from that previously described, including once more a central body 11 from which the masts 12 and 13 protrude, carrying aerodynamic control surfaces similar to those previously described in order to assure the rolling and yawing movements of the satellite 10B. The main difference concerns supplementary masts 19 and 20 carrying solar panels 21 which replace the solar panels 14. The supplementary masts 19 and 20 extend along the yawing axis Z and the solar panels 21 are oriented in the direction of the pitching axis Y and towards the sun, whose direction is almost perpendicular to that of the orbital plane, contrary to the previous embodiment.

FIG. 4 illustrates an orbit C in an equatorial plane. The satellite 10B comprises masts 12, 13, 19 and 20 which are identical to the previous embodiment, that is to say that the first carry the control surface panels 16, 17 and 18 only, and the others carry the solar panels 21.

However, the control surface panels 16, 17 and 18 extend along the yawing axis Z and are directed into the pitching axis Y, whereas the opposite occurs with the solar panels 21. With such an orbit, magnetic moments may be produced around the rolling and yawing axes X and Z but virtually none are produced around the pitching axis Y which is roughly parallel to the Earth's magnetic field. But, in this case, the aerodynamic control surfaces 15 produce moments around the pitching axis Y and the rolling axis X by inclining them in the same way as in the previous embodiments. For the last-named axis, there will thus be two means of orientation available, with preference being given to the magnetic coupler for the reasons of fuel-saving mentioned above.

The control mode of the different appliances will now be considered. In concrete terms, a guidance computer is used, this said computer having the task of adjusting the supply of current to the magnetic couplers 1, 2 and 3 and to the motors 32 and 33, and working with software which calculates at any time the orientation of the Earth's magnetic field $\overline{B}$ in relation to the satellite 10. For this purpose, the satellite may contain a magnetometer capable of providing this measurement, but it is still possible to model the direction of the magnetic field according to its components in relation to the principal axes of the satellite 10 in function of time, that is to say the course of the orbit. It is assumed that no major orientation defect occurs and that the rolling, pitching and yawing axes remain tangential to the orbit and at invariable positions in relation to the said orbit.

An example of modeling the Earth's magnetic field, already used for a different purpose (desaturation of inertia wheels) on the SPOT satellites, is given by the following formulae for a sun-synchronous orbit, in conformity with FIG. 2:

$B_x \approx -B_0 \cdot \cos \omega_0 t$ $B_y \approx 0$ $B_z \approx -2B_0 \cdot \sin \omega_0 t$, where $B_0$ is the value of the Earth's magnetic field at the considered altitude ($2,5.10^{-5}$ tesla at 600 kilometers) and $\omega_0 t$ the angular position of the satellite 10 on the orbit, taking the ascending node for origin. This modeling is somewhat inaccurate since it amounts to supposing that the orbit and the field are perfectly polar. The field must be modeled with additional harmonics (n=3 and n=5) in order to obtain really low errors, in the region of 1%, as against a figure of 20% to 30% with this single harmonic.

If, in these circumstances, the dipolar magnetic moments created by the magnetic couplers 1, 2 and 3 have values if $M_x$, $M_y$ and $M_z$, the magnetic torques produced in the three principal directions are given by the following equations:

$$\overrightarrow{CM} \begin{vmatrix} C_{Mx} = M_y B_z - M_z B_y \\ C_{My} = M_z B_x - M_x B_z \\ C_{Mz} = M_x B_y - M_y B_x \end{vmatrix}$$

The total torque $\overrightarrow{C} = \overrightarrow{C}_M + \overrightarrow{C}_A$ produced on the satellite 10 is the vector sum of the magnetic torque and the aerodynamic torque. This equation may be broken down on each of the axes $C_x = C_{Mx} + C_{Ax}$; $C_y = C_{My} + C_{Ay}$; $C_z = C_{Mz} + C_{Az}$ and, as already mentioned, the aerodynamic torque $C_{Ay}$ around the pitching axis Y is nil, that is to say $C_{MY} = C_Y$. Since, moreover, it is wished that the global value of the aerodynamic torque should be as small as possible, it is desirable that the vectors $\overrightarrow{C}_A$ and $\overrightarrow{C}_M$ should be perpendicular, and the following relations, finally giving $C_{MX}$ and $C_{MZ}$, are deduced:

$\overrightarrow{C}_M \cdot \overrightarrow{B} = 0$, i.e. $C_{Mx} \cdot B_x + C_{My} \cdot B_y + C_{Mz} \cdot B_z = 0$ hence $C_{Mx} B_x + C_{Mz} B_z = -C_y B_y$.

And $\overrightarrow{C}_A \cdot \overrightarrow{U} = 0$, where i.e. $(C_{Mx} - C_x) \cdot (-B_z) + (C_{Mz} - C_z) \cdot B_x = 0$ The total dipolar moment $\overrightarrow{M}$ must also be orthogonal to both $\overrightarrow{B}$ and $\overrightarrow{C}_M$ for the action of the magnetic couplers 1, 2 and 3 to have maximum efficiency, i.e.

$$\overrightarrow{M} = \frac{\overrightarrow{B} \wedge \overrightarrow{C_M}}{\|\overrightarrow{B}\|^2}$$

and finally:

$$\overrightarrow{M} \begin{cases} M_x = \left[ B_y C_z - B_z C_y - B_y B_z \left( \frac{\overrightarrow{B} \cdot \overrightarrow{C}}{D} \right) \right] / \|\overrightarrow{B}\|^2 \\ M_y = [B_z C_x - B_x C_z] / \|\overrightarrow{B}\|^2 \\ M_z = \left[ B_x C_y - B_y C_x + B_x B_y \left( \frac{\overrightarrow{B} \cdot \overrightarrow{C}}{D} \right) \right] / \|\overrightarrow{B}\|^2 \end{cases} \quad (I)$$

where $D = B_x^2 + B_z^2$ and $\overrightarrow{B} \cdot \overrightarrow{C} = B_x C_x + B_y C_y + B_z C_z$.

And in these conditions, the rolling and yawing control surfaces will have to be capable of producing an aerodynamic torque $\overrightarrow{CA}$ so that $$[\overrightarrow{CA}] = \begin{bmatrix} B_x \\ 0 \\ B_z \end{bmatrix} \cdot \left[ \frac{\overrightarrow{B} \cdot \overrightarrow{C}}{D} \right] \quad (II)$$

In conformity with these notations and FIG. 1, the magnetic couplers 1, 2 and 3 whose cores 4 are aligned with the axes X, Y and Z, produce respectively the magnetic moments $M_x$, $M_y$ and $M_z$.

If the notations of FIG. 5 are now chosen, namely $\theta_1$, to $\theta_4$ to describe the tilting of the panels of the aerodynamic control surfaces 15 from the neutral position corresponding to the extension of the panels in the plane of the orbit where i=1 and i=3 for the end panels 17 and 18 of the masts 13 and 12 respectively, and i=2 and i=4 for the central panels 16 of the masts 13 and 12 respectively with $\theta_1$ and $\theta_4$ positive and $\theta_2$ and $\theta_3$ negative in the representation of FIG. 5, $\overrightarrow{V}_i$ to describe the incident speed of the gas atoms on the satellite 10 and the control surface panels, $V_r$ the speed of the reflected atoms (which depends on the angle $\theta_i$) on one of the panels, $\rho$ the density of the atmosphere, S the surface of one of the panels, the impulsion $\overrightarrow{F}$ dt produced on the panel by a volume of gas dm during a time dt is equal to $Fdm(\overrightarrow{V}_i - \overrightarrow{V}_r)$, or, perpendicular to the panel, $Fdt = dm \cdot 2V \cdot \sin \theta_i$. V designates the module of the vector of the incident speed $\overrightarrow{V}_i$, i.e.

$\|\overrightarrow{V}_i\| = V.$

It is also assumed that the reflection of the gas atoms is specular, in other words that the vector $\overrightarrow{V}_r$ of the speed of the reflected particles forms an angle $\theta_i$ with the control surface panel it leaves, which corresponds to the elastic shock conditions where the kinetic energy is not degraded and $\|\overrightarrow{V}_r\|$ remains equal to V. In practice, these conditions are more or less respected if the control surface panels are covered with a hard body such as chromic oxide which has the additional advantage of possessing good resistance to corrosion.

It is recalled that the central panels 16 have a surface equal to that of the sum of the end panels 17 and 18 of the same mast 12 or 13. This surface is noted S/2, and l designates the distance between the inertia center of the satellite 10 and the center of the central panel 16.

Now, the mass flow of gas on the panel surface s/2, equal to $$\frac{dm}{dt},$$

is also given by the expression, $$\left(\frac{S}{2} \cdot \sin\theta\right) \cdot \rho \cdot V,$$

which leads to the formula $$F = 2\sin^2\theta \rho V^2 \frac{S}{2}.$$

The aerodynamic torques to be applied can finally be deduced:

$$C_{Ax} = 2\rho SV^2 l \sum_{i=1}^{4} \frac{\sin 2\theta_i}{2} |\sin\theta_i|$$

$$C_{Ay} = 0$$

$$C_{Az} = 2\rho SV^2 l \sum_{i=1}^{4} (-1)^i |\sin\theta_i|^3,$$

It is now required to obtain reduced aerodynamic torques such as:

$$C_{Ax} = \frac{C_{Ax}}{K} + Bx \cdot \frac{(\vec{B} \cdot \vec{C})}{D \cdot K} \quad (III)$$

where $K = 2\rho SV^2 l$, and $$C_{az} = \frac{C_{az}}{K} + Bz \cdot \frac{(\vec{B} \cdot \vec{C})}{D \cdot K}$$

That is to say:

$$C_{ax} = \sum_{i=1}^{4} \frac{\sin 2\theta_i}{2} |\sin\theta_i| \quad \text{and} \quad C_{az} = \sum_{i=1}^{4} (-1)^i |\sin\theta_i|^3,$$

noted with "a" instead of "A", and which henceforth will be considered alone.

The lift and drag coefficients may be evaluated, for each of the panels, at $2 \sin 2\theta |\sin \theta|$ and $4 |\sin^3\theta|$ respectively. Their sum must preferably always remain low. It is therefore advisable to apply the following laws giving the angles $\theta i$:

1) If $C_{ax} \neq 0$, that is to say, of module greater than $10^{-4}$, for example:
   a) If $C_{az} \geq 0$ and $$0 \leq C_2 \equiv \frac{C_{az}^2}{|C_{ax}|^3} \leq 1.$$

supposing $$X = -\frac{1}{2} + \cos\{[\text{Arc } \cos(1 - 2C_2)]/3\}, \quad (IV)$$

$$|\sin\theta_1| = |C_{ax}|^{1/2} \left[\frac{1}{2} - \frac{1}{2}(1 - 4X^2)^{1/2}\right]^{1/2}$$

with $\theta_1$ of the sign of $C_{ax}$, $$|\sin\theta_2| = |C_{ax}|^{1/2} \left[\frac{1}{2} + \frac{1}{2}(1 - 4X^2)^{1/2}\right]^{1/2}$$

with $\theta_2$ of the sign of $C_{ax}$, and $\theta_3$ and $\theta_4 = 0$.
   b) If $C_{az} \leq 0$ and $1 \leq C_2$, supposing $$\alpha = \frac{1}{2} \left[C_2 + (C_2^2 - 1)^{1/2}\right]^{1/3} + \frac{1}{2} \left[C_2 - (C_2^2 - 1)^{1/2}\right]^{1/3},$$

and $$S = S_2 + S_4 = \alpha^{1/2} \left[1 + \left(\frac{C_2^{1/2}}{\alpha^{3/2}} - 1\right)^{1/2}\right] \text{ (avec } Si = |\sin\theta_i|/|C_{ax}|^{1/2}),$$

for i of 1 to 4, then:

$$|\sin\theta_2| = \frac{|C_{ax}|^{1/2}}{2}[S + S^{-1}], \quad (V)$$

with $\theta_2$ of the sign of $C_{ax}$, and:

$$|\sin\theta_4| = \frac{|C_{ax}|^{1/2}}{2}[S - S^{-1}],$$

with $\theta_4$ of the sign of $(-C_{ax})$, and $\theta_1 = \theta_3 = 0$.
   c) If $C_{az} \leq 0$ and $0 \leq C_2 \leq 1$ with X as previously, $$|\sin\theta_1| = |C_{ax}|^{1/2} \left[\frac{1}{2} + \frac{1}{2}(1 - 4X^2)^{1/2}\right]^{1/2}$$

with $\theta_1$ of the sign of $C_{ax}$, $$|\sin\theta_2| = |C_{ax}|^{1/2} \left[\frac{1}{2} - \frac{1}{2}(1 - 4X^2)^{1/2}\right]^{1/2} \quad (VI)$$

with $\theta_1$ of the sign of $C_{ax}$, $$|\sin\theta_2| = |C_{ax}|^{1/2} \left[\frac{1}{2} - \frac{1}{2}(1 - 4X^2)^{1/2}\right]^{1/2} \quad (VI)$$

with $\theta_2$ of the sign of $C_{ax}$, and $\theta_3 = \theta_4 = 0$.
   d) If $C_{az} \leq 0$ and $1 \leq C_2$, with $\alpha$ as previously, and $$= S_1 + S_3 = \alpha^{1/2} \left[1 + (C_2^{1/2}/\alpha^{3/2} - 1)^{1/2}\right], \quad (VII)$$

$$|\sin\theta_1| = \frac{|C_{ax}|^{1/2}}{2}(S + S^{-1}),$$

with $\theta_1$ of the sign of $C_{ax}$, $$|\sin\theta_3| = \frac{|C_{ax}|^{1/2}}{2}(S - S^{-1}),$$

with $\theta$ of the sign of $-C_{ax}$, and $\theta_2 = \theta_4 = 0$.

FIG. 6 is a graphic representation of these functions.

2) If $C_{ax} \approx 0$, that is to say, of module less than $10^{-4}$, for example:
   a) If $C_{az} \geq 0$, $$\theta_1 = \theta_3 = 0 \quad \text{et} \quad |\sin \theta_2| = |\sin \theta_4| = \left(\frac{C_{az}}{2}\right)^{1/3} \text{ with } \theta_2 = \theta_4; \quad \text{(VIII)}$$

b) If $C_{az} \leq 0$, $$\theta_2 = \theta_4 = 0 \quad \text{et} \quad |\sin \theta_1| = |\sin \theta_3| = \left(\frac{C_{az}}{2}\right)^{1/3} \text{ with } \theta_1 = \theta_3; \quad \text{(IV)}$$

It is clear that, like the windings 5 and 6 of the magnetic couplers 1, 2 and 3, the control surface panel system is redundant and therefore continues to be useful when an unexpected disruption occurs. Taking $G_1$ to G4 as indicating the panels or pairs of panels associated with the inclination angles $\theta_1$ to $\theta_4$, it is recommended to apply the substitution process summarized in Table 1 which lists the control surfaces to be used when replacing a defective panel.

TABLE 1

| DEFECTIVE PANEL | | $G_1$ | $G_2$ | $G_3$ | $G_4$ |
|---|---|---|---|---|---|
| $C_{az} > 0$ | $C_2 < 1$ | $G_2$ and $G_3$ | $G_1$ and $G_4$ | $G_1$ and $G_2$ | $G_1$ and $G_2$ |
| | $C_2 > 1$ | $G_2$ and $G_4$ | $G_1, G_3$ and $G_2$ and $G_4$ | $G_1, G_2$ and $G_4$ | $G_3$ |
| $C_{az} < 0$ | $C_2 < 1$ | $G_2$ and $G_3$ | $G_1$ and $G_4$ | $G_1$ and $G_2$ | $G_1$ and $G_2$ |
| | $C_2 > 1$ | $G_2, G_3$ and $G_4$ | $G_{1 \text{ and } G3}$ | $G_1, G_2$ and $G_4$ | $G_1$ and $G_3$ |

The angles at which these control surfaces must be moved depend not only on the desired moments but also on the breakdown position of the other control surface, which makes any attempt to give all the possibilities an extremely tedious undertaking.

It must be added that the aerodynamic control surfaces 15 may be assigned the task of braking the satellite 10, and thus certain corrections of orbit. It suffices to obtain $\theta_1 = -\theta_3 = \theta_2 = -\theta_4$ to produce zero aerodynamic moments and a total drag force proportional to $|\sin \theta_1|^3$.

The command laws given here may easily be modified to suit other forms of orbit. Similarly, the arrangement of the control surfaces given here allow the satellite to be used for all low-orbit inclinations.

What is claimed is:

1. Artificial satellite comprising:
   magnetic generators having rotation moments around three principal axes (X, Y, Z) of the satellite;
   turning external panels for supplying aerodynamic rotation moments around two of the principal axes (X, Z or X, Y), wherein said two of said principal axes are chosen depending on the type and orbit of the satellite and wherein the magnetic generators and the panels are associated by command laws which function in order to induce said panels and said magnetic generators to produce variable moments.

2. Artificial satellite according to claim 1, characterized in that the external panels are arranged symmetrically in relation to an inertia center of the satellite.

3. Artificial satellite according to claim 2, characterized in that the external panels are of the number of two pairs and rotate about approximately aligned axes.

4. Artificial satellite according to claim 3, characterized in that the panels of each of the pairs have an identical surface and consist of a central panel and two identical semi-panels, solidly attached to and framing the central panel.

5. Control process of an artificial satellite according to claim 1 and in orbit around a planet and immersed in an atmosphere and a magnetic field, characterized in that it consists of periodically measuring or estimating the planet's magnetic field (B) in relation to the principal axes of the satellite, and of calculating the rotation moments to be produced around the principal axes by the magnetic generators and the external panels.

6. Control process of an artificial satellite according to claim 5, characterized in that it consists of calculating by the magnetic generators rotation moments for which the rotation moments produced by the external panels have a minimum global value.

7. Control process of an artificial satellite according to claim 5, characterized in that the satellite travels in a quasi-polar orbit and in that the moments produced by the external panels are rolling and yawing moments.

8. Control process of an artificial satellite according to claim 5, characterized in that the satellite travels in an equatorial orbit and in that the moments produced by the external panels are pitching and rolling moments.

9. Control process of an artificial satellite according to claim 5, characterized in that the external panels are controlled in such a way as to minimize the drag efforts produced by the atmosphere.

10. Control process of an artificial satellite according to claim 6, characterized in that the magnetic moments (M) are produced in conformity with the formulae $$M_x = \left[B_y C_z - B_z C_y - B_y B_z \left(\frac{\vec{B} \cdot \vec{C}}{D}\right)\right] / \|\vec{B}\|^2$$

$$M_y = [B_z C_x - B_x C_z] / \|\vec{B}\|^2$$

$$M_z = \left[B_x C_y - B_y C_x + B_x B_y \left(\frac{\vec{B} \cdot \vec{C}}{D}\right)\right] / \|\vec{B}\|^2$$

where x, y and z designate the principal axes of the satellite, $B_x$, $B_y$ and $B_z$ the components of the ambient magnetic field B according to the principal axes produced on the satellite by the magnetic generators and the panels according to the principal axes, and $C_x$, $C_y$ and $C_z$ the components of the total moment C produced on the satellite by the magnetic generators and the panels according to the principal axes, and where $D = B_x^2 + B_z^2$ and B. $C = B_x + C_x + B_y + C_y + B_z + C_z$.

11. Control process of an artificial satellite according to claims 9 and 10, characterized in that the external panels are controlled in conformity with the following formulae, for a satellite fitted with four external panels of equal surface and distributed by symmetrical pairs by forming angles $\theta_1$ to $\theta_4$ to a direction of movement of the satellite, the panels of one of the pairs forming angles $\theta_1$ and $\theta_2$, those of the other pair $\theta_3$ and $\theta_4$ and the panels forming respectively the angles $\theta_1$ and $\theta_3$ and $\theta_2$ and $\theta_4$, being situated laterally on a same side of the satellite, and noting:

$$C_{ax} = \sum_{i=1}^{4} \frac{\sin 2\theta_i}{2} |\sin \theta_i| \quad \text{et} \quad C_{az} = \sum_{i=1}^{4} (-1)^i |\sin \theta_i|^3,$$

1) If $C_{ax} \neq 0$:

a) If $C_{az} \geq 0$ and $$0 \leq C_2 \equiv \frac{C_{az}^2}{|C_{ax}|^3} \leq 1,$$

supposing

X=−½+cos{[Arc cos(1−2C$_2$)]/3}, $$|\sin\theta_1| = |C_{ax}|^{1/2}\left[\frac{1}{2} - \frac{1}{2}(1-4X^2)^{1/2}\right]^{1/2}$$

with $\theta_1$ of the sign of $C_{ax}$, $$|\sin\theta_2| = |C_{ax}|^{1/2}\left[\frac{1}{2} + \frac{1}{2}(1-4X^2)^{1/2}\right]^{1/2}$$

with $\theta_2$ of the sign of $C_{ax}$,
and $\theta_3$ and $\theta_4$=0;
 b) If $C_{az} \geq 0$ and $1 \leq C_2$, supposing $$\alpha = \frac{1}{2}\left[C_2 + (C_2^2 - 1)^{1/2}\right]^{1/3} + \frac{1}{2}\left[C_2 - (C_2^2 - 1)^{1/2}\right]^{1/3},$$

and $$S = S_2 + S_4 = \alpha^{1/2}\left[1 + \left(\frac{C_2^{1/2}}{\alpha^{3/2}} - 1\right)^{1/2}\right] \text{ (avec } S_i = |\sin\theta_i|/|C_{ax}|^{1/2}\text{)}$$

for i of 1 to 4, then:

$$|\sin\theta_2| = \frac{|C_{ax}|^{1/2}}{2}[S + S^{-1}],$$

with $\theta_2$ of the sign of $C_{ax}$, and:

$$|\sin\theta_4| = \frac{|C_{ax}|^{1/2}}{2}[S - S^{-1}],$$

with $\theta_4$ of the sign of $(-C_{ax})$,
and $\theta_1 = \theta_3 = 0$;
 c) If $C_{az} \leq 0$ and $0 \leq C_2 \leq 1$ with X as previously, $$|\sin\theta_1| = |C_{ax}|^{1/2}\left[\frac{1}{2} + \frac{1}{2}(1-4X^2)^{1/2}\right]^{1/2}$$

with $\theta_1$ of the sign of $C_{ax}$, $$|\sin\theta_2| = |C_{ax}|^{1/2}\left[\frac{1}{2} - \frac{1}{2}(1-4X^2)^{1/2}\right]^{1/2}$$

with $\theta_2$ of the sign of $C_{ax}$,
and $\theta_3 = \theta_4 = 0$;
 d) If $C_{az} \leq 0$ and $1 \leq C_2$,
with α as previously,
and $$S = S_1 + S_3 = \alpha^{1/2}\left[1 + (C_2^{1/2}/\alpha^{3/2} - 1)^{1/2}\right],$$

$$|\sin\theta_1| = \frac{|C_{ax}|^{1/2}}{2}(S + S^{-1}),$$

with $\theta_1$ of the sign of $C_{ax}$, $$|\sin\theta_3| = \frac{|C_{ax}|^{1/2}}{2}(S - S^{-1}),$$

and $\theta_2 = \theta_4 = 0$;
 2) If $C_{ax} \approx 0$, that is to say, of module less than $10^{-4}$, for example:
  a) If $C_{az} \geq 0$, $$\theta_1 = \theta_3 = 0 \text{ et } |\sin\theta_2| = |\sin\theta_4| = \left(\frac{C_{az}}{2}\right)^{1/3}$$

with $\theta_2 = -\theta_4$;
  b) If $C_{az} \leq 0$, $$\theta_2 = \theta_4 = 0 \text{ et } |\sin\theta_1| = |\sin\theta_3| = \left(\frac{C_{az}}{2}\right)^{1/3}$$

with $\theta_1 = \theta_3$.

12. Artificial satellite intended to fly in an atmosphere, fitted with magnetic generators for supplying independent rotation moments about three distinct axes of the satellite, further comprising turning external panels for supplying aerodynamic rotation moments about only two distinct axes of the satellite, and command means for actuating the magnetic generators and turning the external panels so that determined rotation moments are supplied to the satellite, a global value of the aerodynamic rotation moments being minimal.

13. Artificial satellite according to claim 1, wherein the turning external panels are capable of supplying said aerodynamic rotation moments about said two distinct axes only.

14. Control process for an artificial satellite traveling along a predetermined orbit above a planet, the satellite being immersed in an atmosphere and a magnetic filed, and being fitted with magnetic generators for supplying independent rotation moments about three distinct axes of the satellite, further comprising turning external panels for supplying aerodynamic rotation moments about only two distinct axes of the satellite, and command means for actuating the magnetic generators and turning the external panels, consisting in periodically:
  measuring or estimating the magnetic field,
  calculating total rotation moments to impart to the satellite in order to follow the orbit,
  turning the external panels to supply respective first parts of the total rotation moment, and actuating the magnetic generator to supply respective second, complementary parts of the total rotation moments,
  said turning of the external panels being adjusted so that a global value of said first parts of the total rotation moments remains minimal.

15. A control process according to claim 14, wherein a component of the total rotation moments that is oriented about a direction of the magnetic field is supplied only by the external panels, and a vectorial sum of the first parts of the total rotation moments is perpendicular to a vectorial sum of the first parts of the total rotation moments.

* * * * *